United States Patent [19]

Green et al.

[11] Patent Number: 5,229,452
[45] Date of Patent: Jul. 20, 1993

[54] CARBON BLACKS

[75] Inventors: Martin C. Green, Burlington; Mark A. Wilkinson, Lexington; Bruce E. Mackay, Framingham, all of Mass.

[73] Assignee: Cabot Corporation, Boston, Mass.

[21] Appl. No.: 791,153

[22] Filed: Nov. 13, 1991

[51] Int. Cl.$^5$ .............................................. C08K 3/04
[52] U.S. Cl. ................................ 524/415; 423/449.1; 423/450
[58] Field of Search ................... 423/445, 449.1, 450; 524/495

[56] References Cited

U.S. PATENT DOCUMENTS 4,075,156  2/1978  Johnson .............................. 423/445

FOREIGN PATENT DOCUMENTS 61-47758   3/1986  Japan .................................. 423/445
61-283635 12/1986  Japan .................................. 423/445

OTHER PUBLICATIONS

ASTM D-1765-89 report p. 316 published 1989.
"Carbon Blacks for Specialty Applications" Cabot Corporation Jun. 1988.

Primary Examiner—Wayne Langel
Assistant Examiner—Stuart L. Hendrickson
Attorney, Agent, or Firm—Lawrence A. Chaletsky; Harry J. Gwinnell

[57] ABSTRACT

Novel carbon blacks having an $I_2$No. of 26–34 mg/g; a CTAB of 26–34 m$^2$/g; a Tint of 46–54%; a DBP of 61–69 cc/100 g and a Dst/Dmode ratio of 1.31–136. Preferably the carbon blacks are additionally characterized by having a Number Median ($D_c/D_p$) of 2.7–3.1. Also disclosed are novel rubber and plastic compositions which, when the novel carbon blacks are incorporated therein, have lowered viscosity properties during subsequent processing.

7 Claims, 2 Drawing Sheets

CARBON BLACKS

FIELD OF THE INVENTION

The present invention relates to a class of new and novel furnace carbon blacks which are suitable for various applications and particularly well suited for use in plastic compositions.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents, and for a variety of other applications. Carbon blacks are widely utilized as fillers and reinforcing pigments in the compounding and preparation of rubber compositions and plastic compositions. Carbon blacks are generally characterized on the basis of their properties including, but not limited to, their surface areas, surface chemistry, aggregate sizes, and particle sizes. The properties of carbon blacks are analytically determined by tests known to the art, including iodine adsorption number ($I_2No.$), nitrogen adsorption surface area ($N_2SA$), dibutyl phthalate adsorption (DBP), dibutyl phthalate adsorption of the crushed carbon black (CDBP), cetyl-trimethyl ammonium bromide absorption value (CTAB), Tint value (TINT), Dmode, Dst, $\Delta D50$, and Number Median $D_c/D_p$.

It is generally understood that the properties of a carbon black affect the properties of rubber or plastic compositions containing the carbon black. For example, the introduction of carbon black into a rubber or plastic composition during formation of the composition will generally affect the viscosity of the rubber or plastic composition. Lower viscosity rubber or plastic compositions are advantageous as they are more easily processed. Therefore, it is advantageous to have a carbon black that imparts a lower viscosity to rubber or plastic compositions during processing, without adversely affecting other properties of the rubber or plastic composition.

SUMMARY OF THE INVENTION

We have discovered new carbon blacks having an Iodine adsorption number ($I_2No.$) of 26–34 mg/g (milligrams $I_2$ per gram carbon black); a CTAB (cetyl-trimethyl ammonium bromide absorption value) of 26–34 m$^2$/g (square meters per gram); a DBP (dibutyl phthalate value) of 61–69 cc/100 g (cubic centimeters of dibutyl phthalate per 100 grams carbon black) a Tint value ("Tint") of 46–54%; and a Dst/Dmode ratio of 1.31–1.36. Preferably the carbon blacks are further characterized by having a Number Median ($D_c/D_p$) of 2.7–3.1. Number Median ($D_c/D_p$) is defined as the carbon black aggregate circle diameter ($D_c$) divided by the average carbon black primary particle diameter ($D_p$) for that aggregate. The method for determining $D_p$, the average carbon black primary particle diameter for an aggregate, is described in ASTM Test Procedure No. D 3849, Section 11.2.2. $D_c$, the carbon black aggregate circle diameter is described by the relationship: $D_c = \sqrt{4A/\pi}$. A equals projected aggregate area, and is defined in ASTM Test Procedure No. D 3849, Section 3.2.1. As will be understood by those of ordinary skill in the art, the Number Median ($D_c/D_p$) is the median of the distribution of the ratio ($D_c/D_p$) for each aggregate in a group of carbon black aggregates and therefore may not equal the median of $D_c$ for the group of aggregates divided by the median of $D_p$ for the group of aggregates.

We have also discovered a new class of rubber/plastic compositions containing the carbon blacks.

The carbon blacks of the present invention may be produced in a furnace carbon black reactor having a first (combustion) zone, a transition zone, and a reaction zone. A carbon black yielding feedstock is injected into a hot combustion gas stream. The resultant mixture of hot combustion gases and feedstock passes into the reaction zone. Pyrolysis of the carbon black yielding feedstock is stopped by quenching the mixture after the carbon blacks of the present invention have been formed. Preferably pyrolysis is stopped by injecting a quenching fluid. The process for preparing the novel carbon blacks of the present invention will be described in greater detail hereinafter.

The rubbers and plastics for which the novel carbon blacks of this invention are effective include natural and synthetic rubbers and plastics. Generally, amounts of the carbon black product ranging from about 10 to about 250 parts by weight can be used for each 100 parts by weight of rubber or plastic. It is, however, preferred to use amounts varying from about 20 to about 100 parts by weight of carbon black per 100 parts by weight of rubber or plastic and especially preferred is the utilization of from about 40 to about 80 parts of carbon black per 100 parts of rubber or plastic.

Among the rubbers or plastics suitable for use with the present invention are natural rubber, synthetic rubber and their derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene. Additionally preferred polymeric compositions are olefins such as polypropylene and polyethylene that are particularly well suited for use in industrial rubber applications.

An advantage of the carbon blacks of the present invention is that the carbon blacks are useful for incorporation into natural rubbers, synthetic rubbers, plastics or blends thereof for industrial applications.

A further advantage of the carbon blacks of the present invention is that the carbon blacks, when incorporated into plastics result in the production of plastic formulations having lower viscosity during processing.

Other advantages of the present invention will become apparent from the following more detailed description of the invention.

DETAILED DESCRIPTION OF THE INVENTION

The carbon blacks of the present invention have the following combination of analytical properties:

$26 \text{ mg/g} \leq I_2\text{No.} \leq 34 \text{ mg/g}$ $26 \text{ m}^2/\text{g} \leq \text{CTAB} \leq 34 \text{ m}^2/\text{g}$ $61 \text{ cc/100 g} \leq \text{DBP} \leq 69 \text{ cc/100 g}$.

$46\% \leq \text{Tint} \leq 54\%$ $1.31 \leq D_{st}/D_{mode} \leq 1.36$

Preferably, the carbon blacks of the present invention are additionally characterized by having the following property in combination with the foregoing properties:

$2.7 \leq \text{Number Median } (D_c/D_p) \leq 3.1$.

Figure 1:
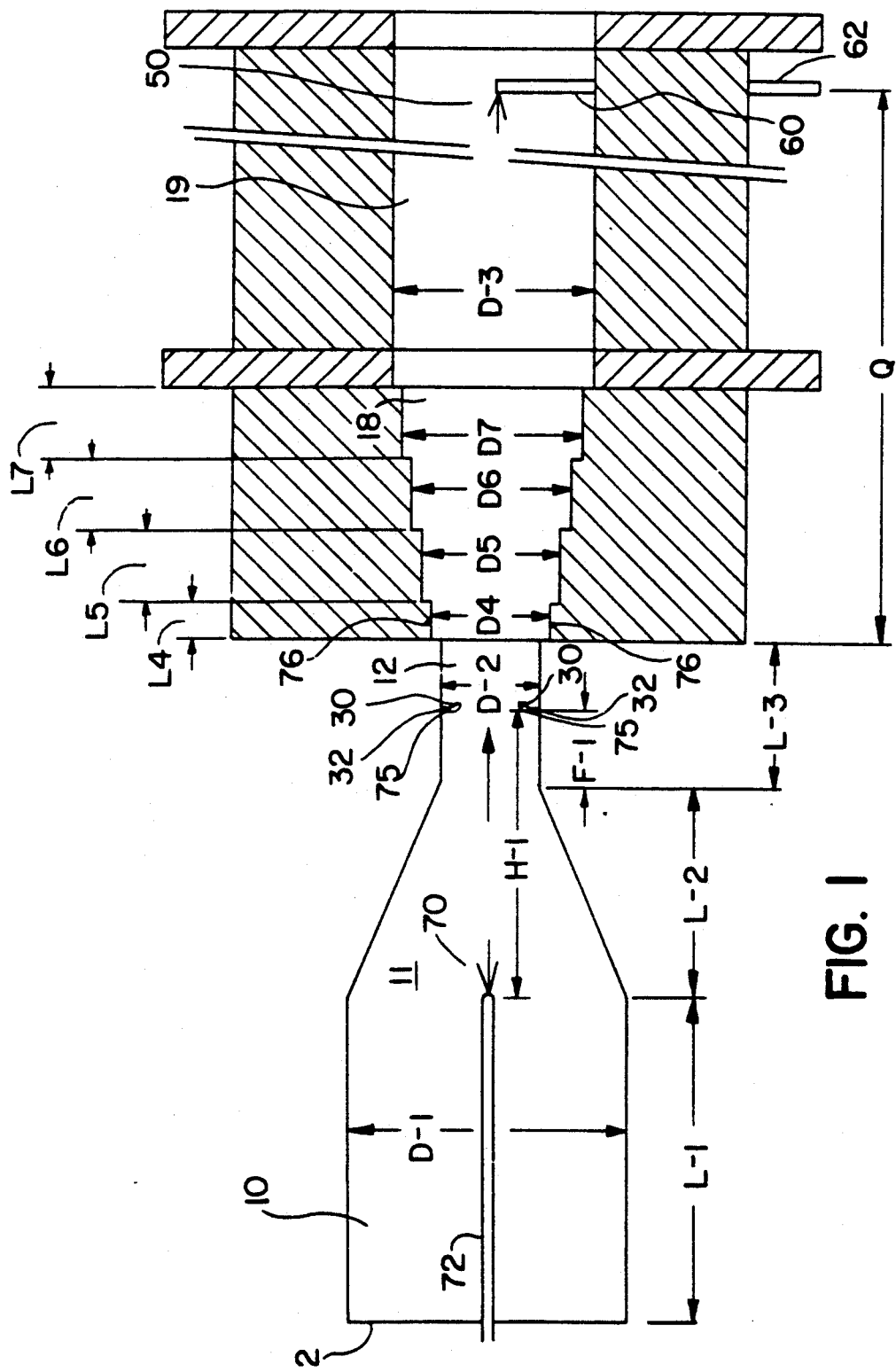
FIG. 1 is a cross-sectional view of a portion of one type of furnace carbon black reactor which may be utilized to produce the carbon blacks of the present invention.

The carbon blacks of the present invention may be produced in a modular, also referred to as "staged", furnace carbon black reactor. A section of a typical modular furnace carbon black reactor which may be utilized to produce the carbon black of the present invention is depicted in FIG. 1. Other details of a typical modular furnace carbon black reactor may be found, for example, in the description contained in U.S. Pat. No. 3,922,335, the disclosure of which is herein incorporated by reference.

The carbon black of the Example described herein was made by the process described in the commonly assigned U.S. patent application Ser. No. 07/661,741, filed Feb. 27, 1991, the disclosure of which is hereby incorporated by reference.

Referring to FIG. 1, the carbon blacks of the present invention may be produced in a furnace carbon black reactor 2, having a combustion zone 10, which has a zone of converging diameter 11, transition zone 12, entry section 18, and reaction zone 19. The diameter of the combustion zone 10, up to the point where the zone of converging diameter 11 begins, is shown as D-1; the diameter of zone 12, as D-2; the diameters of the stepped entry section, 18, as D-4, D-5, D-6, and D-7; and the diameter of zone 19, as D-3. The length of the combustion zone 10, up to the point where the zone of converging diameter 11 begins, is shown as L-1; the length of the zone of converging diameter is shown as L-2; the length of the transition zone is shown as L-3; and the lengths of the steps in the reactor entry section, 18, as L-4, L-5, L-6 and L-7.

To produce carbon blacks, hot combustion gases are generated in combustion zone 10, by contacting a liquid or gaseous fuel with a suitable oxidant stream such as air, oxygen, mixtures of air and oxygen or the like. Among the fuels suitable for use in contacting the oxidant stream in combustion zone 10 to generate the hot combustion gases are any of the readily combustible gas, vapor, or liquid streams such as natural gas, hydrogen, carbon monoxide, methane, acetylene, alcohol, or kerosene. It is generally preferred, however, to utilize fuels having a high content of carbon-containing components and in particular, hydrocarbons. The ratio of air to natural gas utilized to produce the carbon blacks of the present invention may preferably be from about 10:1 to about 100:1. To facilitate the generation of hot combustion gases, the oxidant stream may be preheated.

The hot combustion gas stream flows downstream from zones 10 and 11 into zones 12, 18, and 19. The direction of the flow of hot combustion gases is shown in the figure by the arrow. Carbon black-yielding feedstock 30 is introduced at point 32 (located in zone 12), and/or at point 70 (located in zone 11). Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like.

The distance from the end of the zone of converging diameter 11 to point 32 is shown as F-1. Generally, carbon black-yielding feedstock 30 is injected in the form of a plurality of streams which penetrate into the interior regions of the hot combustion gas stream to insure a high rate of mixing and shearing of the hot combustion gases and the carbon black-yielding feedstock so as to rapidly and completely decompose and convert the feedstock to carbon black.

Auxiliary hydrocarbon is introduced at point 70 through probe 72 or through auxiliary hydrocarbon passages 75 in the walls which form the boundaries of zone 12 of the carbon black forming process or through auxiliary hydrocarbon passages 76 in the walls which form the boundaries of zones 18 and/or 19 of the carbon black forming process. The auxiliary hydrocarbon may be introduced at an axial location between the point immediately after the initial combustion reaction of the first-stage fuel and the point immediately before the end of formation of carbon black provided that unreacted auxiliary hydrocarbon eventually enters the reaction zone. The distance from point 32 to point 70 is shown as H-1.

In the Example described herein, the auxiliary hydrocarbon was introduced through four orifices in the same axial plane as the carbon black yielding feedstock streams. The orifices are arranged in an alternating pattern, one feedstock, the next auxiliary hydrocarbon, spaced evenly around the outer periphery of section 12. As will be noted, however, this is merely exemplary and is not intended to be limiting of the methods useable for introducing auxiliary hydrocarbon.

The mixture of carbon black-yielding feedstock and hot combustion gases flows downstream through zone 12 into zone 18 and then into zone 19. Quench 60, located at point 62, injecting quenching fluid 50, which may be water, is utilized to stop chemical reaction when carbon blacks are formed. Point 62 may be determined in any manner known to the art for selecting the position of a quench to stop pyrolysis. One method for determining the position of the quench to stop pyrolysis is by determining the point at which an acceptable toluene extract level for the carbon black is reached. Toluene extract level may be measured by using ASTM Test D1618-83 "Carbon Black Extractables-Toluene Discoloration". Q is the distance from the beginning of zone 18 to quench point 62, and will vary according to the position of Quench 60.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in evaluating the analytical and physical properties of the carbon blacks of the present invention.

CTAB (cetyl-trimethyl ammonium bromide) absorption value of the carbon blacks was determined according to ASTM Test Procedure D3765-85. Iodine adsorption number of the carbon blacks ($I_2$ No.) was determined according to ASTM Test Procedure D 1510. Tinting strength (Tint) of the carbon blacks was determined according to ASTM Test Procedure D3265-85a. The DBP (dibutyl phthalate value) of the carbon blacks was determined according to the procedure set forth in ASTM D3493-86.

Figure 2:
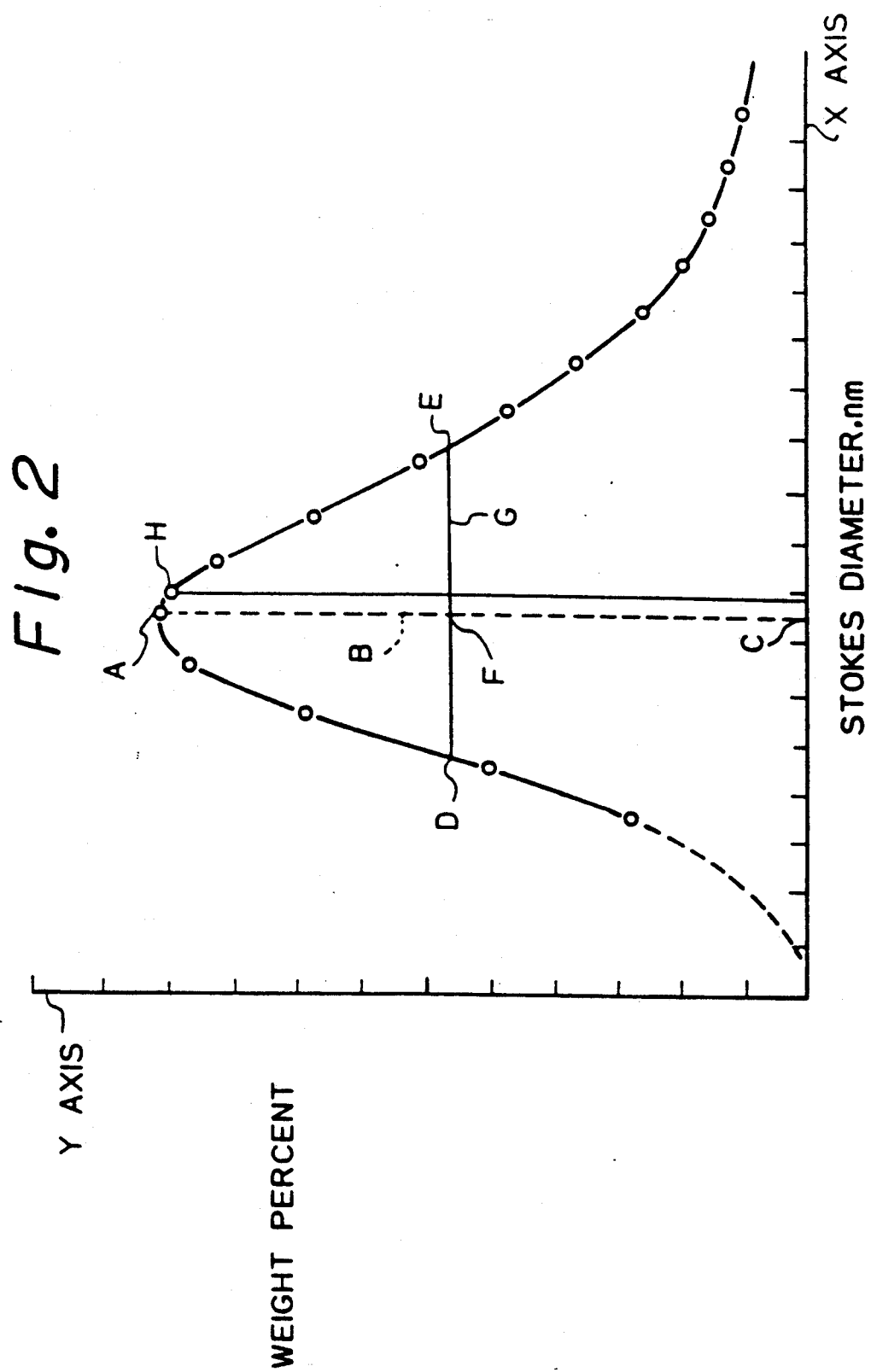
FIG. 2 is a sample histogram of the weight fraction of the aggregates of a carbon black sample versus the Stokes Diameter in a given sample.

Dmode, and Dst of the carbon blacks were determined from a histogram of the weight fraction of carbon black versus the Stokes diameter of the carbon black aggregates, as shown in FIG. 2. The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C;
5. The density of the spin fluid, which in this instance is 0.9975 g/cc at 23 degrees C;
6. The disk speed, which in this instance is 8000 rpm;
7. The data sampling interval, which in this instance is 1 second. The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A nonspherical object, such as a carbon black aggregate, may also be represented in terms of the Stokes diameter if it is considered as behaving as a smooth, rigid sphere of the same density, and rate of sedimentation as the object. The customary units are expressed in nanometer diameters.

Mode (Dmode for reporting purposes)—The Stokes diameter at the point of the peak (Point A of FIG. 2 herein) of the distribution curve for Stokes diameter.

Mediam Stokes diameter—(Dst for reporting purposes) the point on the distribution curve of Stokes diameter where 50% by weight of the sample is either larger or smaller. It therefore represents the median value of the determination.

As set forth above, Number Median ($D_c/D_p$) is defined as the carbon black aggregate circle diameter ($D_c$) divided by the average carbon black primary particle diameter ($D_p$) for that aggregate. The method used for determining $D_p$, the average carbon black primary particle diameter for an aggregate, is described in ASTM Test Procedure No. D 3849, Section 11.2.2. $D_c$, the carbon black aggregate circle diameter is described by the relationship: $D_c = \sqrt{4A/\pi}$. A is the projected aggregate area, and is defined in ASTM Test Procedure No. D 3849, Section 3.2.1.

The effectiveness and advantages of the present invention will be further illustrated by the following example.

EXAMPLE

An example of the novel carbon blacks of the present invention was prepared in a reactor generally described herein, and as depicted in FIG. 1, utilizing the reactor conditions and geometry set forth in Table 2. The fuel utilized in the combustion reaction was natural gas. The auxiliary hydrocarbon used was also natural gas. The liquid feedstock utilized had the properties indicated in Table 1 below:

TABLE 1

| Feedstock Properties | |
|---|---|
| Hydrogen/Carbon Ratio | 0.93 |
| Hydrogen (wt. %) | 7.19 |
| Carbon (wt. %) | 92.1 |
| Sulfur (wt. %) | 0.3 |
| Nitrogen (wt. %) | 0.41 |
| A.P.I. Gravity 15.6/15.6 °C. (60) F. [ASTM D-287] | −1.6 |
| Specific Gravity 15.5/15.6 °C. (60) F. [ASTM D-287] | 1.092 |
| Viscosity, SUS (54.4° C.) $m^2/s$ [ASTM D-88] | $2.7 \times 10^{-5}$ |
| Viscosity, SUS (98.9° C.) $m^2/s$ [ASTM D-88] | $5.2 \times 10^{-6}$ |
| BMCI (Visc-Grav) | 133 |

The reactor conditions and geometry were as set forth in Table 2 below.

TABLE 2

| Reactor Geometry and Operating Conditions | |
|---|---|
| D-1 (m) | 0.18 |
| D-2 (m) | 0.13 |
| D-3 (m) | 0.69 |
| D-4 (m) | 0.25 |
| D-5 (m) | 0.69 |
| D-6 (m) | 0.69 |
| D-7 (m) | 0.69 |
| L-1 (m) | 0.61 |
| L-2 (m) | 0.30 |
| L-3 (m) | 0.23 |
| L-4 (m) | 0.30 |
| L-5 (m) | 0.10 |
| L-6 (m) | 0.00 |
| L-7 (m) | 0.00 |
| F-1 (m) | 0.11 |
| Q (m) | 7.93 |
| Combustion Air (SCMS) | 0.634 |
| Comb Air Preheat (K.) | 755 |
| Burner Natural Gas (SCMS) | $1.99 \times 10^{-2}$ |
| Feedstock Injection Orifice Diameter (cm) | 0.193 |
| Number of Feedstock Injection Orifices | 4 |
| Feedstock Rate ($m^3/s$) | $1.35 \times 10^{-4}$ |
| Feedstock Temperature (K.) | 461 |
| Feedstock Potassium Concentration ($g/m^3$) | 10.6 |
| Auxiliary Hydrocarbon Injection Method | Four (4) 0.635 m Diameter Orifices |
| Auxiliary Hydrocarbon Injection Location | Point 75 in FIG. 1 |
| Auxiliary Hydrocarbon Flow Rate (SCMS) | $3.4 \times 10^{-3}$ |
| Primary Combustion (%) | 325 |
| Overall Combustion (%) | 24.1 |

The carbon black produced was then analyzed according to the procedures described herein. The analytical properties of the carbon black produced, after wet pelletizing and drying are shown in Table 3:

TABLE 3

| Carbon Black Analytical Properties | |
|---|---|
| $I_2$No. (mg/g) | 30 |
| CTAB ($m^2/g$) | 31 |
| Tint (%) | 53 |
| DBP (cc/100 g) | 64 |
| Dmode (nm) | 168 |
| Dst (nm) | 228 |
| Dst/Dmode | 1.36 |
| Number Median ($D_c/D_p$) | 2.87 |

The carbon black of the above example, when incorporated into a plastic formulation, will result in the plastic formulation having lower viscosity properties during subsequent processing.

It should be clearly understood that the forms of the present invention herein described are illustrative only and are not intended to limit the scope of the invention.

We claim:

1. A carbon black having an $I_2$No. of 26–34 mg/g; a CTAB of 26–34 $m^2/g$; a Tint of 46–54%; a DBP of 61–69 cc/100 g and a Dst/Dmode ratio of 1.31–136.

2. The carbon black of claim 1 additionally characterized by having a Number Median ($D_c/D_p$) of 2.7–3.1.

3. The carbon black of claim 1 wherein the $I_2$No. is about 30 mg/g, the CTAB is about 31 $m^2/g$, the Tint is about 53%, the DBP is about 64 cc/100 g and the Dst/Dmode ratio is about 1.36.

4. The carbon black of claim 3 additionally characterized by having a Number Median ($D_c/D_p$) of about 2.87.

5. A composition comprising about 100 parts, by weight, of a rubber and from about 10 to about 250 parts, by weight, of a carbon black having an $I_2$No. of 26–34 mg/g; a CTAB of 26–34 $m^2/g$; a Tint of 46–54%; a DBP of 61–69 cc/100 g and a Dst/Dmode ratio of 1.31–136.

6. The composition of claim 5 wherein the carbon black is additionally characterized by having a Number Median ($D_c/D_p$) of 2.7–3.1.

7. The composition of claim 6 wherein the $I_2$No. of the carbon black is about 30 mg/g, the CTAB of the carbon black is about 31 $m^2/g$, the Tint of the carbon black is about 53%, the DBP of the carbon black is about 64 cc/100 g, the Dst/Dmode ratio of the carbon black is about 1.36 and the Number Median ($D_c/D_p$) of the carbon black is about 2.87.

* * * * *